United States Patent Office 3,534,027
Patented Oct. 13, 1970

3,534,027
PYRROLYL ETHYLAMINO SULFAMOYL BENZOIC ACIDS, ESTERS AND SALTS THEREOF
Leo Bernard Czyzewski, Nutley, Arthur Martin Felix, Clifton, and Rodney Ian Fryer, North Caldwell, N.J., assignors to Hoffmann-La Roche Inc., Nutley, N.J., a corporation of New Jersey
No Drawing. Filed Apr. 25, 1968, Ser. No. 724,293
Int. Cl. C07d 27/22; A61k 27/00
U.S. Cl. 260—239.65                                    7 Claims

ABSTRACT OF THE DISCLOSURE

The present disclosure relates to diuretically and saluretically active compounds, i.e., 4-chloro-2-[2-(2-pyrrolyl)ethylamino]-5-sulfamoylbenzoic acids, esters and addition salts thereof.

BRIEF DESCRIPTION OF THE INVENTION

This invention relates to novel compounds which can be represented by the following formula:

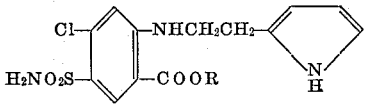

wherein R is hydrogen, lower alkyl, alkali metal cation and alkaline earth metal cation.

In preferred embodiments, R in Formula I above is hydrogen or sodium. In the most preferred embodiment of the present invention, R in Formula I above is hydrogen, e.g., 4-chloro-2-[2-(2-pyrrolyl)ethylamino]-5-sulfamoylbenzoic acid.

The term "lower alkyl" as used throughout this disclosure comprehends both straight and branched chain hydrocarbon groups having from 1 to 7 carbon atoms, preferably 1 to 4 carbon atoms, for example, methyl, ethyl, n-propyl, isopropyl, butyl, isobutyl, tertiary butyl, and the like.

The compounds of the present invention are useful as diuretics and saluretics. These compounds can be administered internally, for example, orally or parenterally, in convenient pharmaceutical dosage forms such as tablets, solutions, suspensions, capsules and the like, with or without excipients. When administered orally or parenterally, satisfactory results may be obtained at a daily dosage level of from about 50 mg. to about 500 mg., it being understood of course, that the dosage level may be lesser or greater than in the aforesaid range based upon the identity of the subjects and the ends sought by the person administering the compound.

The novel compounds of the present invention represented by Formula I may be prepared by several different routes. In one embodiment of the present invention, for example, compounds of the Formula I above where R is hydrogen or lower alkyl are obtained by reacting 2-fluoro-4-chloro-5-sulfamoylbenzoic acid or lower alkyl ester with β-(2-pyrrole)ethylamine, in an inert solvent at a temperature in the range from about 25° C. to the reflux temperature of the solvent, preferably in the range from about 40 to 120° C. Suitable solvents for this reaction include dimethylformamide, dimethylsulfoxide, hexamethylphosphoramide and the like.

The product compound of Formula I where R is lower alkyl is obtained when the lower alkyl ester form of the starting material is used. The ester is converted to the free acid by hydrolysis in the presence of a strong base, e.g., an alkali metal hydroxide such as sodium or potassium hydroxide followed by acidification. Obviously, when a free acid form of the starting material is used initially, the product will be obtained as the acid in this embodiment.

The free acid form of the compounds of Formula I may be converted into a compound of Formula I where R is an alkali or alkaline earth metal cation by treating said free acid compound with an aqueous or alcoholic solution of a salt of the desired alkali or alkaline earth metal cation.

Similarly, the above free acid compound may be readily converted into a compound of Formula I where R is lower alkyl by treatment of said free acid compound with a lower alkyl esterifying agent such as diazomethane or suitable alkanol by procedures well known in the art.

In another aspect of the present invention, compounds of Formula I may be prepared by reacting β-(2-pyrrole) ethylamine with 2,4-dichloro-5-sulfamoylbenzoic acid or corresponding lower alkyl ester using conditions and solvents described above. When the lower alkyl ester is used, the resulting crude ester product (R—lower alkyl in Formula I) is subjected to hydrolysis with a strong base such as an alkali metal hydroxide, e.g., sodium hydroxide or potassium hydroxide, followed by acidification with mineral acid, e.g., hydrochloric acid to give the crude acid form and finally triturating the acid form with an alkali metal bicarbonate, e.g., sodium bicarbonate. When the free acid is used initially, the product is not hydrolyzed with base but is treated with bicarbonate directly. The latter step serves to separate the desired compound of the present invention from the other isomer formed by reaction of the β-(2-pyrrole)ethylamine with the 4-chloro of the starting material. The bicarbonate treatment yields the alkali metal salt of the product compound.

The compounds of the present invention, where R is hydrogen, are obtained from the above alkali metal salts by treatment with an acidic agent such as an organic or inorganic acid in a manner known in the art. Examples of inorganic acids useful for this purpose include the mineral acids, e.g., hydrochloric acid. Examples of organic acids include acetic acid, formic acid, etc.

The compounds of Formula I where R is lower alkyl are conveniently prepared in purified form from the corresponding sulfamoyl benzoic acid obtained above by treatment with a lower alkyl esterifying agent such as diazomethane or a suitable alkanol by procedures well known in the art. Similarly, those compounds of Formula I in which R is an alkali or alkaline earth metal cation may be re-obtained in purified form from the aforesaid sulfamoyl benzoic acid by treating said acid with an aqueous or alcoholic solution of a salt of the desired alkali or alkaline earth metal cation.

Of the two preparative procedures outlined above, the former procedure utilizing 2-fluoro-4-chloro-5-sulfamoyl benzoic acid would be of greater preference since the problem of the formation of two isomers and separating the isomers via the bicarbonate salt which occurs with the second method is not present. This is due to the fact that the fluoro group in the aforesaid benzoic acid is much more reactive than the 4-chloro group and the reaction will thus proceed almost completely to the desired product.

As indicated previously, the compounds of the present invention have been discovered to possess diuretic and saluretic activity. It has further been unexpectedly found that the saluretic effect induced by the compounds of the present invention is of relatively short duration. Thus, subjects treated with compounds of the present invention are seen to return to predosage salt excretion levels quite soon after treatment has been initiated. This is an extremely useful property in a compound having diuretic and saluretic activity since it substantially reduces the risk of causing hypochloremia, hyponatremia, or hypokalemia which imbalances can be precipitated by residual saluretic activity if a plurality of dosages of the compound are given. This is one of the main reasons why some of the more recently developed potent diuretics may be administered only under close and continual medical observation.

The following examples are illustrative but not limitative of the compounds of this invention and the procedures for their preparation. All temperatures stated are in degrees centigrade.

EXAMPLE 1

Preparation of sodium 4-chloro-2-[2-(2-pyrrolyl)ethylamino]-5-sulfamoylbenzoate

A solution of 30.6 g. (0.28 mole) of β-(2-pyrrol)ethylamine in 60 ml. of dry N,N-dimethylformamide was treated with 22.6 g. (0.08 mole) of methyl-2,4-dichloro-5-sulfamoylbenzoate. The reaction mixture was warmed at 60° for two hours, poured into 800 ml. of cold water and the pH was adjusted to within the range of about 2 to 6 with hydrochloric acid. The aqueous phase was decanted from the gummy solid which contained impure methyl 4 - chloro - 2 - [2 - (2 - pyrrolyl)ethylamino] - 5-sulfamoylbenzoate. The gummy solid then was washed with water and dissolved in 350 ml. of 0.5 N potassium hydroxide solution. The solution was warmed at 50–60° for one hour, cooled, washed with ethyl acetate (3× 200 ml.) and made acidic (pH 2) with hydrochloric acid. The residue which contained impure 4-chloro-2-[2-(pyrrolyl)-ethylamino]-5-sulfamoylbenzoic acid, was extracted with ethyl acetate (2× 250 ml.), the organic layers were combined, washed with water (2× 300 ml.), saturated brine (2× 200 ml.) and concentrated to dryness. The residue was triturated with 50 ml. of warm saturated sodium bicarbonate solution which was then cooled and allowed to stand overnight at 5°. The precipitated above-titled product having a melting point of 222–226° was recovered by filtration.

EXAMPLE 2

Preparation of 4-chloro-2-[2-(2-pyrrolyl)ethylamino]-5-sulfamoylbenzoic acid

The sodium 4-chloro-2[2-pyrrolyl)ethylamino]-5-sulfamoylbenzoate prepared by the procedure of Example 1 was dissolved in 200 ml. of hot water and filtered. The filtrate was acidified to pH 2 with 3 N hydrochloric acid and cooled to 0° for 1.5 hours. The above-titled product, having a M.P. of 196–198° (dec.), was recovered by filtration.

EXAMPLE 3

Preparation of methyl 4-chloro-2-[2(2-pyrrolyl)ethylamino]-5-sulfamoylbenzoate

A solution of 344 mg. (1 mmol.) of 4-chloro-2-[2-(2-pyrrolyl)ethylamino]-5-sulfamoylbenzoic acid hemihydrate in 10 ml. of methanol was treated by the dropwise addition of 35 ml. of an ethereal solution of diazomethane. The solution of diazomethane was prepared according to "Org. Synthesis," Collective vol. II, p. 166, note 3, using 2.0 g. N-nitroso-N-methylurea and 15 ml. of 40% KOH in a total of 100 ml. ether. Stirring was continued until no starting material remained (visual estimation by thin layer chromatography) when the solution was evaporated to dryness. The residual oil was dissolved in chloroform which was then washed with saturated sodium bicarbonate and saturated brine. The solution was dried over anhydrous magnesium sulfate and evaporated to dryness. The product was crystallized from a mixture of methanol and water to give the above titled product as white prisms, M.P. 160–163°.

EXAMPLE 4

Preparation of 4-chloro-2-[2-pyrrolyl)ethylamino]-5-sulfamoylbenzoic acid hemihydrate from 2,4-dichloro-5-sulfamoylbenzoic acid A mixture of 2.0 g. (0.0074 m.) of 2,4-dichloro-5-sulfamoylbenzoic acid and 2.4 g. (0.0222 m.) of β-(2-pyrrol)ethylamine in 10 ml. of dimethyl sulfoxide was warmed at 120° for 5 hours and then cooled to room temperature. The reaction mixture was poured into 200 ml. of ice water and the mixture was acidified to pH 6 with 2 N hydrochloric acid. The solids were collected by filtration and dissolved in 1 N potassium hydroxide. The solution was washed with ethyl acetate (2× 100 ml.), acidified with 2 N hydrochloric acid in an ice bath at 0° and the precipitate was obtained by filtration. The isomers were separated via the insoluble sodium salt as per the procedure of Example 1. The above-titled product was recovered by reacidification as white prisms, melting at 204–207° decomp.

EXAMPLE 5

Preparation of 4-chloro-2-[2-(2-pyrrolyl)ethylamino]-5-sulfamoylbenzoic acid hemihydrate from 2-fluoro-4-chloro-5-sulfamoylbenzoic acid A mixture of 2.0 g. (0.0079 m.) of 2-fluoro-4-chloro-5-sulfamoylbenzoic acid and 2.6 g. (0.024 m.) of β-(2-pyrrol)ethylamine in 10 ml. of dry dimethylsulfoxide was warmed at 80° for 4 hours. The mixture was cooled, poured into 200 ml. of ice water which was then acidified to pH 6 with 2 N hydrochloric acid. The solids were collected by filtration, dissolved in 1 N potassium hydroxide which was then washed with ethyl acetate (2× 100 ml.). The solution was acidified with 2 N hydrochloric acid in an ice bath (0°) and the above-titled product was obtained by filtration as white prisms, melting at 204–207° decomp.

EXAMPLE 6

Preparation of 4-chloro-2-[2-(2-pyrrolyl)ethylamino]-5-sulfamoylbenzoic acid hemihydrate from 2-fluoro-4-chloro-5-sulfamoylbenzoic acid A mixture of 2.0 g. (0.0075 m.) of methyl-2-fluoro-4-chloro-5-sulfamoylbenzoate and 2.6 g. (0.27 m.) of β-(2-pyrrol)-ethylamine in 10 ml. of dry dimethylsulfoxide was warmed at 80° for 4 hours, cooled and poured into 150 ml. of ice water. The solution was acidified to pH 6 with 2 N hydrochloric acid and then solids were collected by filtration. The residue was dissolved in 50 ml. of 0.5 N potassium hydroxide solution and warmed at 55° for one hour. The solution was cooled to room temperature and extracted with ethyl acetate (3× 100 ml.). The basic solution was cooled in an ice bath, acidified with concentrated hydrochloric acid to pH 2 and the product was extracted into ethyl acetate (2× 150 ml.). The combined ethyl acetate layers were washed with water (2× 100 ml.), dried over anhydrous magnesium sulfate, filtered and evaporated to dryness to give the above-titled product as white prisms, melting at 204–207° decomp.

EXAMPLE 7

The unique nature of the saluretic response induced in subjects by the administration of compounds of the present invention is graphically demonstrated in comparative experiments conducted on a nembutalized dog. The comparative drug utilized in this test was Furosemide which is well known in the art to be a potent diuretic and saluretic. See for example Modern Drugs (October-December 1966), pp. 192–194.

The dogs utilized in the following tests were fasted for 18 hours, (water permitted ad libitum) and anestheized with 30 m. sodium pentabarbital/kg. i.v. Each ureter was cannulated and a pooled urine specimen collected. The femoral vein was cannulated and a 3 ml./min. infusion initiated. The trachea was cannulated to ensure unobstructed breathing (no artificial respiration was administered). The test animal was orally hydrated with 30 ml./kg. distilled deionized water. Thirty minutes later a second water load (30 ml./kg. per os) was administered.

The test involved the use of 3 animals. The first was given an intraintestinal injection of distilled water (5 ml./kg.) as a placebo. The second animal was given an intraintestinal injection of 4 - chloro - 2-[2-(2-pyrrolyl)

ethylamino] - 5 - sulfamoylbenzoic acid (50 mg./kg.) (Compound A) in distilled water (5 ml./kg.).

The third and final test animal was given an intraintestine injection of Furosemide (50 mg./kg.) in distilled water (5 ml./kg.).

Following the second hydration the animal was permitted to equilibrate, and after a suitable time urine samples were collected at fifteen minute intervals. The samples were analyzed for Na+ and Cl− concentration. The results of this test are summarized below in the following table.

EXCRETED ELECTROLYTES (mµEq./min.)

| Time, min. | Na+ | Cl− | Na+ | Cl− | Na+ | Cl− |
|---|---|---|---|---|---|---|
| Control mean −30 | 127 | 47 | 113 | 61 | 30 | 6 |
| 0 | Placebo | | 50 mg./kg. (Intraintestine) Compound A | | 50 mg./kg. (Intraintestine) Furosemide | |
| 15 | 102 | 25 | 173 | 150 | 135 | 172 |
| 30 | 80 | 16 | 252 | 252 | 208 | 280 |
| 45 | 69 | 12 | 141 | 113 | 173 | 194 |
| 60 | 72 | 13 | 97 | 53 | 162 | 166 |
| Mean | 81 | 16 | 166 | 142 | 189 | 203 |
| 75 | 75 | 14 | 76 | 29 | 117 | 117 |
| 90 | 84 | 13 | 78 | 21 | 111 | 111 |
| 105 | 79 | 11 | 89 | 22 | 124 | 121 |
| 120 | 85 | 9 | 101 | 22 | 125 | 115 |
| Mean | 81 | 12 | 86 | 23 | 119 | 116 |
| 135 | 90 | 10 | 105 | 21 | 116 | 103 |
| 150 | 91 | 8 | 80 | 15 | 123 | 106 |
| 165 | 96 | 10 | 81 | 10 | 115 | 96 |
| 180 | 102 | 10 | 76 | 7 | 120 | 100 |
| Mean | 95 | 9 | 85 | 13 | 118 | 101 |
| 195 | 101 | 8 | 66 | 6 | 87 | 71 |
| 210 | 107 | 9 | 61 | 3 | 96 | 72 |
| 225 | 109 | 10 | 73 | 4 | 87 | 62 |
| 240 | 109 | 10 | 74 | 2 | 80 | 53 |
| Mean | 106 | 9 | 68 | 4 | 87 | 64 |
| Female dogs | 9.2 kg. | | 10 kg. | | 9.2 kg. | |

Examination of the above table clearly shows that the compound of the present invention, identified as Compound A, produces an initial saluresis of virtually equivalent potency to that demonstrated by Furosemide. However, within about an hour, the salt excretion levels for the Compound A treated subject returned to their pre-dosage levels; while the subject treated with Furosemide was observed to retain a residual high level of saluresis even after the passage of four hours.

EXAMPLE 8

The diuretic and saluretic activity of Compound A in normal mice was tested. The test involved intraperitoneal injection of a placebo and Compound A to different groups of mice, each group consisting of ten mice. The urine from each group of mice was pooled to yield one sample per group. The urine volume was recorded and the pooled samples were analyzed for sodium, chloride and potassium in concentrations. Compound A was administered in dosage levels of 0.5 and 1.0 m./mouse. The results of this test are summarized in the following table with the results being expressed for Compound A at both dosage levels as percent of placebo values.

| Compound A | Percent of placebo value | |
|---|---|---|
| | 0.5 mg. | 1.0 mg. |
| Urine volume | 160 | 189 |
| Sodium | 178 | 228 |
| Potassium | 77 | 155 |
| Chloride | 171 | 202 |
| Na/K | | |

Examination of the above table clearly evidences the effective diluretic said saluretic activity of Compound A at the dosages tested in the subject mice.

EXAMPLE 9

This example demonstrates the effectiveness of Compound A as a diuretic and saluretic when administered orally to normal dogs. The subjects of this test were a 9.3 kg. female dog (Subject A) and a 10.4 kg. male dog (Subject B), which were kept in a metabolism cage (which facilitates the collection of 24 hour urine samples) during each test. The animals' food intake was regulated but water was permitted ad libitum. On one test day the animals were dosed orally with 25 mg./kg. of Compound A and on another day with 50 mg./kg. Three two-hour urine samples were collected followed by an eighteen hour urine collection period for each test. The urine volume and electrolyte values were determined and compared to previously established controls. The results are summarized in the following table and are expressed as percentages of 24-hour drug effect to 24-hour pre-drug control results.

| Compound A | 25 mg./kg. | | 50 mg./kg. | |
|---|---|---|---|---|
| | Sub. A | Sub. B | Sub. A | Sub. B |
| Urine volume | 200 | 160 | 320 | 160 |
| Sodium | 224 | 184 | 401 | 260 |
| Potassium | 161 | 128 | 119 | 100 |
| Chloride | 286 | 212 | 460 | 314 |

Examination of the above table demonstrates the usefulness of Compound A administered orally as a diuretic and saluretic.

EXAMPLE 10

Tablet formulation: Per tablet, mg.
- 4 - chloro-2-[2-(2-pyrrolyl)ethylamino]-5-sulfamoylbenzoic acid hemihydrate _____ 10.0
- Lactose _____ 113.5
- Corn starch _____ 70.5
- Pregelatinized corn starch _____ 8.0
- Calcium stearate _____ 3.0

Total weight _____ 205.0

Procedure (1) 4-chloro - 2 - [2-(2-pyrrolyl)ethylamino]-5-sulfamoylbenzoic acid hemihydrate was mixed with the lactose, corn starch and pregelatinized corn starch in a suitable size mixer.

(2) The mix was passed through a Fitzpatrick comminuting machine fitted with #1A screen and with knives forward.

(3) The mix was returned to the mixer and moistened with water to a thick paste. The moist mass was passed through a #12 screen and the moist granules were dried on paper lined trays at 110° F.

(4) The dried granules were returned to the mixer, the calcium stearate was added and mixed well.

(5) The granules were compressed at a tablet weight of 200 mg. using standard concave punches having a diameter of 5/16".

EXAMPLE 11

Tablet formulation: Per tablet, mg.
- 4-chloro-2-[2-(2-pyrrolyl)ethylamino - 5 - sulfamoylbenzoic acid hemihydrate _____ 25.00
- Lactose, U.S.P. _____ 64.50
- Corn starch _____ 10.00
- Magnesium stearate _____ 0.50

Procedure (1) 4-chloro - 2 - [2-(2-pyrrolyl)ethylamino]-5-sulfamoylbenzoic acid hemihydrate was mixed with the lactose, corn starch and magnesium stearate in a suitable mixer.

(2) The mixture was further blended by passing through a Fitzpatrick comminuting machine fitted with a #1A screen with knives forward.

(3) The mixed powders were slugged on a tablet compressing machine.

(4) The slugs were comminuted to a suitable mesh size (#16 screen) and mixed well.

(5) The tablets were compressed at a tablet weight of 100 mg. using tablet punches having a diameter of approximately ¼". (Tablets may be either flat or biconvex and may be scored if desired.)

EXAMPLE 12

| Capsule formulation: | Per capsule, mg. |
|---|---|
| 4-chloro - 2 - [2-(2-pyrrolyl)ethylamino]-5-sulfamoylbenzoic acid hemihydrate | 25 |
| Lactose | 158 |
| Corn starch | 37 |
| Talc | 5 |
| Total weight | 225 |

Procedure (1) 4-chloro - 2 - [2-(2-pyrrolyl)ethylamino]-5-sulfamoylbenzoic acid hemihydrate was mixed with the lactose and corn starch in a suitable mixer.

(2) The mixture was further blended by passing through a Fitzpatrick comminuting machine was a #1A screen with knives forward.

(3) The blended powder was returned to the mixer, the talc added and blended thoroughly. The mixture was then filled into #4 hard shell gelatin capsules on a Parke Davis capsulating machine. (Any similar type machine may be used.)

EXAMPLE 13

| Capsule formulation: | Per capsule, mg. |
|---|---|
| 4-chloro - 2 - [2-(2-pyrrolyl)ethylamino]-5-sulfamoylbenzoic acid hemihydrate | 50 |
| Lactose, U.S.P. | 125 |
| Corn starch, U.S.P. | 30 |
| Talc, U.S.P. | 5 |
| Total weight | 210 |

Procedure (1) 4-chloro - 2 - [2-(2-pyrrolyl)ethylamino]-5-sulfamoylbenzoic acid hemihydrate was mixed with lactose and corn starch in a suitable mixer.

(2) The mixture was further blended by passing through a Fitzpatrick comminuting machine with a #1A screen with knives forward.

(3) The blended powder was returned to the mixer, the talc added and blended thoroughly.

(4) The mixture was filled into #4 hard shell gelatin capsules on a Parke Davis capsulating machine.

We claim:

1. A compound of the formula

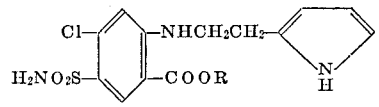

in which R is hydrogen, lower alkyl, alkali metal cation and alkaline earth metal cation.

2. The compound of claim 1, wherein R is an alkali metal cation.

3. The compound of claim 2, wherein R is a sodium cation, e.g., sodium 4-chloro - 2 - [2-(2-pyrrolyl)ethylamino]-5-sulfamoylbenzoate.

4. The compound of claim 1 wherein R is hydrogen, e.g., 4 - chloro-2-[2-(2-pyrrolyl)ethylamino]-5-sulfamoylbenzoic acid.

5. The compound of claim 4 having one-half mole of water in its crystaline form, e.g., 4-chloro-2-[2-(2-pyrrolyl)ethylamino]-5-sulfamoylbenzoic acid hemihydrate.

6. The compound of claim 1, wherein R is lower alkyl.

7. The compound of claim 6, wherein R is methyl, e.g., methyl 4-chloro - 2 - [2-(2-pyrrolyl)ethylamino]-5-sulfamoylbenzoate.

References Cited

UNITED STATES PATENTS

| 3,454,562 | 7/1969 | Loev et al. | 260—239.6 |
| 3,058,882 | 10/1962 | Sturm et al. | 167—51.5 |

OTHER REFERENCES

Fieser et al., Adv. Org. Chem. (Reinhold, N.Y., 1961), p. 376.

HENRY R. JILES, Primary Examiner

C. M. SHURKO, Assistant Examiner

U.S. Cl. X.R.

260—239.6, 326.9, 470, 518; 424—229